United States Patent [19]

Brodersen

[11] Patent Number: 5,169,113
[45] Date of Patent: Dec. 8, 1992

[54] APPARATUS FOR CONTROLLING AND PROTECTING A VEHICLE SEAT SUSPENSION

[75] Inventor: Cole T. Brodersen, Davenport, Iowa

[73] Assignee: Sears Manufacturing Company, Davenport, Iowa

[21] Appl. No.: 610,082

[22] Filed: Nov. 7, 1990

[51] Int. Cl.$^5$ ................................................ A47C 3/30
[52] U.S. Cl. .................................... 248/550; 248/421; 248/631; 297/345
[58] Field of Search ................ 248/550, 631, 584, 421, 248/157, 161, 563, 423, 188.2; 297/339, 347, 345

[56] References Cited

U.S. PATENT DOCUMENTS

| | | | |
|---|---|---|---|
| 4,032,103 | 6/1977 | Ehrics | 248/421 |
| 4,034,948 | 7/1977 | Brownell | 248/243 X |
| 4,213,594 | 7/1980 | Dietsch et al. | 248/550 |
| 4,225,178 | 9/1980 | Takada | 248/563 X |
| 4,461,444 | 7/1984 | Grassl et al. | 248/550 |
| 4,484,723 | 11/1984 | Meiller et al. | 248/550 |
| 4,566,667 | 1/1986 | Yanagisawa | 248/421 X |
| 4,589,620 | 5/1986 | Sakamoto | 248/421 |
| 4,638,982 | 1/1987 | Misher et al. | 248/550 X |
| 4,645,169 | 2/1987 | Mischer | 248/550 |
| 4,650,148 | 3/1987 | Sakamoto | 248/421 X |
| 4,733,847 | 3/1988 | Grassl | 248/550 |
| 4,822,094 | 4/1989 | Oldfather et al. | 248/421 X |
| 4,941,641 | 6/1990 | Granzow et al. | 248/421 X |

FOREIGN PATENT DOCUMENTS

| | | | |
|---|---|---|---|
| 73096 | 2/1983 | European Pat. Off. | 297/347 |
| 2129678A | 5/1984 | United Kingdom | 297/347 |

Primary Examiner—Carl D. Friedman
Assistant Examiner—Derek J. Berger
Attorney, Agent, or Firm—Niro, Scavone, Haller & Niro

[57] ABSTRACT

A device is disclosed that overrides the manual controls for filling and emptying an air suspension spring, so that the spring is not over-filled or under-filled. The device also includes a mechanism for limiting the rise of the seat suspension when the driver exits the seat. The invention has a latch bar that slides through two pieces of lubricating plastic. A ramped section of the latch bar contacts one of two switches that prevents the adjustment of a seat suspension below a minimum safe ride position or prevents adjustment above a maximum safe position. The latch bar also includes notches that are engageable with a latch pawl that is operated by a solenoid. When an operator leaves the seat, the solenoid is energized and drives the latch pawl into a notch in the latch bar. An electronic switch also enables the deenergizing of the solenoid, yet the latch pawl locks the latch bar so that the air spring does not cause a substantial rise in the seat suspension.

11 Claims, 3 Drawing Sheets

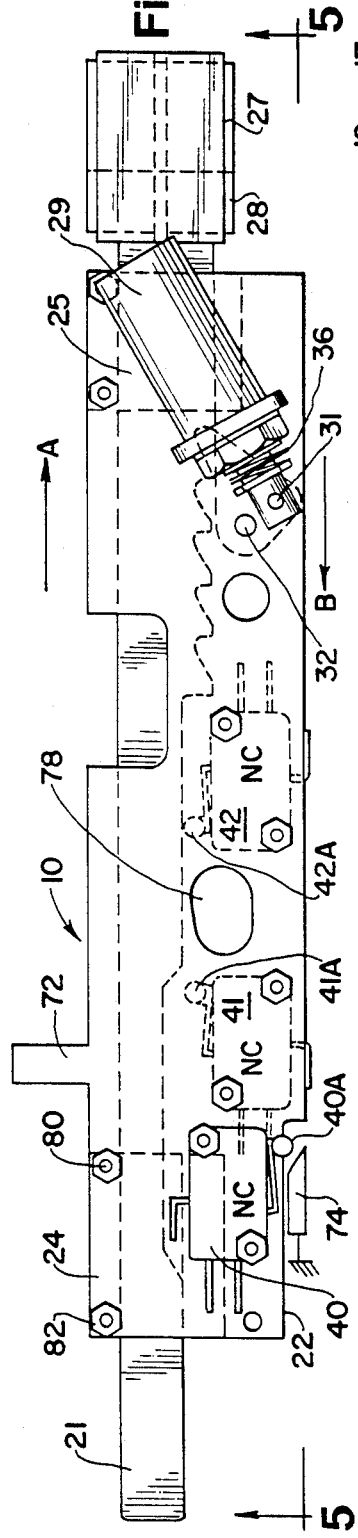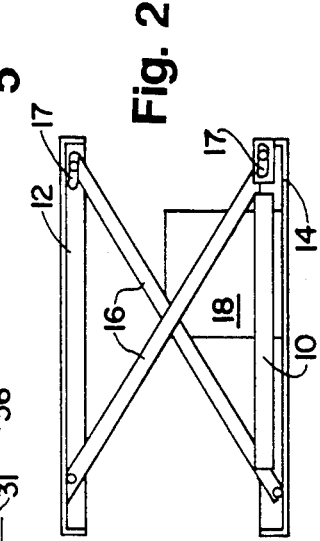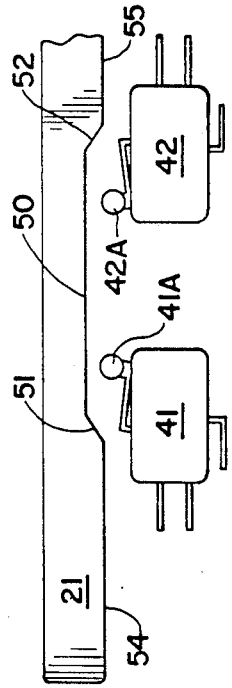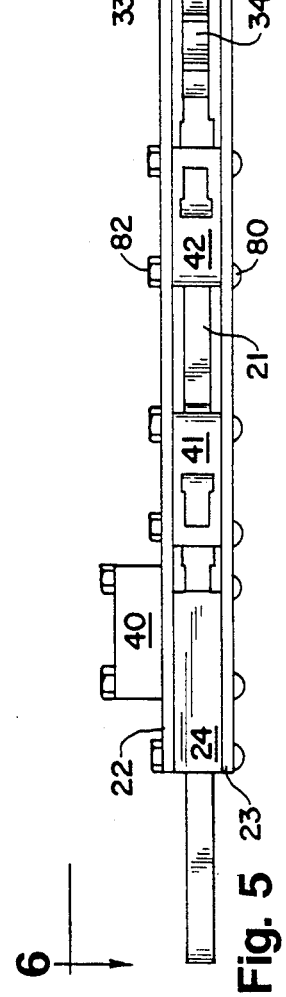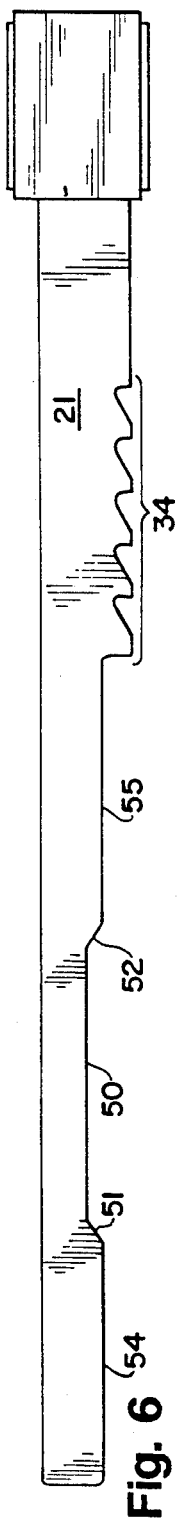

APPARATUS FOR CONTROLLING AND PROTECTING A VEHICLE SEAT SUSPENSION

BACKGROUND OF THE INVENTION

The present invention relates to a vehicle seat suspension apparatus, and, more particularly, to an apparatus for controlling and protecting an air suspension system used to support a vehicle seat.

It is well known in the art to use adjustable air suspension systems to provide support for vehicle seats. Typically, these suspensions can be adjusted to accommodate both the weight and height of different seat occupants. An example of such a suspension system is disclosed in U.S. Pat. No. 4,733,847 to Grassl.

Until recently, typical air suspension springs were not completely air tight, and would lose pressure slowly over time. Vehicle seats using these suspensions controlled the air pressure in the spring by a series of sensors and switches. A sensing device was used to determine whether enough air had leaked from the spring to warrant addition of more air. Often a complex assembly of switches and sensors were necessary, employing timing circuits programmed to determine whether the load reduction on the air spring was caused by a brief bounce of the suspension system or a loss of air. Recent developments have enabled the construction of an air spring that, for practical purposes, is air tight and does not require the compensation features of the prior art. Suspensions using these air springs simply control the seat height by an up and down switch that charges or discharges air from the spring. It is desirable, however, to protect these suspension devices so that a vehicle operator does not over-pressurize or under-pressurize the spring, causing inadequate suspension performance or perhaps even permanent damage.

Another problem that has occurred in the use of air suspension devices is the excessive upward movement of the seat when a driver exits the vehicle. If the seat rises too far, it is more difficult for the driver to reenter the vehicle and to readjust the height of the seat, especially in vehicle cabs that are designed with strict height limitations.

SUMMARY OF THE INVENTION

The present invention solves the problems associated with the prior art. For a particular range of air pressure, the ride zone protection feature of the invention overrides the manual operation of the charging and discharging of the air spring. Thus, when the pressure in the air spring reaches a predetermined maximum, the ride zone protection feature prohibits the driver from further pressurizing the spring. Similarly, when the gas pressure is at a predetermined minimum, the ride zone protection feature disables the discharge mechanism that would otherwise permit air to exit from the spring.

The up-stop feature of the present invention limits the vertical distance that a seat travels when an operator exits the vehicle. This is accomplished by sensing when the driver exits the seat and then immediately locking the suspension so that it cannot move upward despite the pressure in the air spring.

Accordingly, it is an object of the present invention to provide a vehicle seat suspension apparatus having a rid zone protection device to permit control of the pressure of the suspension air spring within predetermined maximum and minimum limits. It is a further object of the present invention to provide a vehicle seat suspension apparatus having such a ride zone protection device and which is both relatively simple in design and inexpensive to manufacture.

Still another object of the invention is to be able to provide a vehicle seat suspension apparatus with an up-stop feature which is reliable and effective.

Thus, the present invention includes a movable member responsive to the vertical motion of the vehicle seat and means for controlling the charging or discharging of air into and out of the spring. The invention also includes means for actuating or disabling the control means which is responsive to movement of the movable member. Furthermore, a means for sensing the removal of load on the air spring and for locking the suspension prevents the air spring from causing excessive rise of the vehicle seat.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 2 is a schematic elevation of a seat suspension with an air spring and the present invention;

FIG. 3 is a plan view of the present invention;

FIG. 4 is a plan view of the latch bar and the electrical switches controlling the compressor and solenoid valve;

FIG. 5 is a side elevation of FIG. 3 taken through Section 5—5;

FIG. 6 is a plan view of the latch bar taken through Section 6—6 in FIG. 5; and

DETAILED DESCRIPTION OF THE PREFERRED EMBODIMENTS

Figure 1:
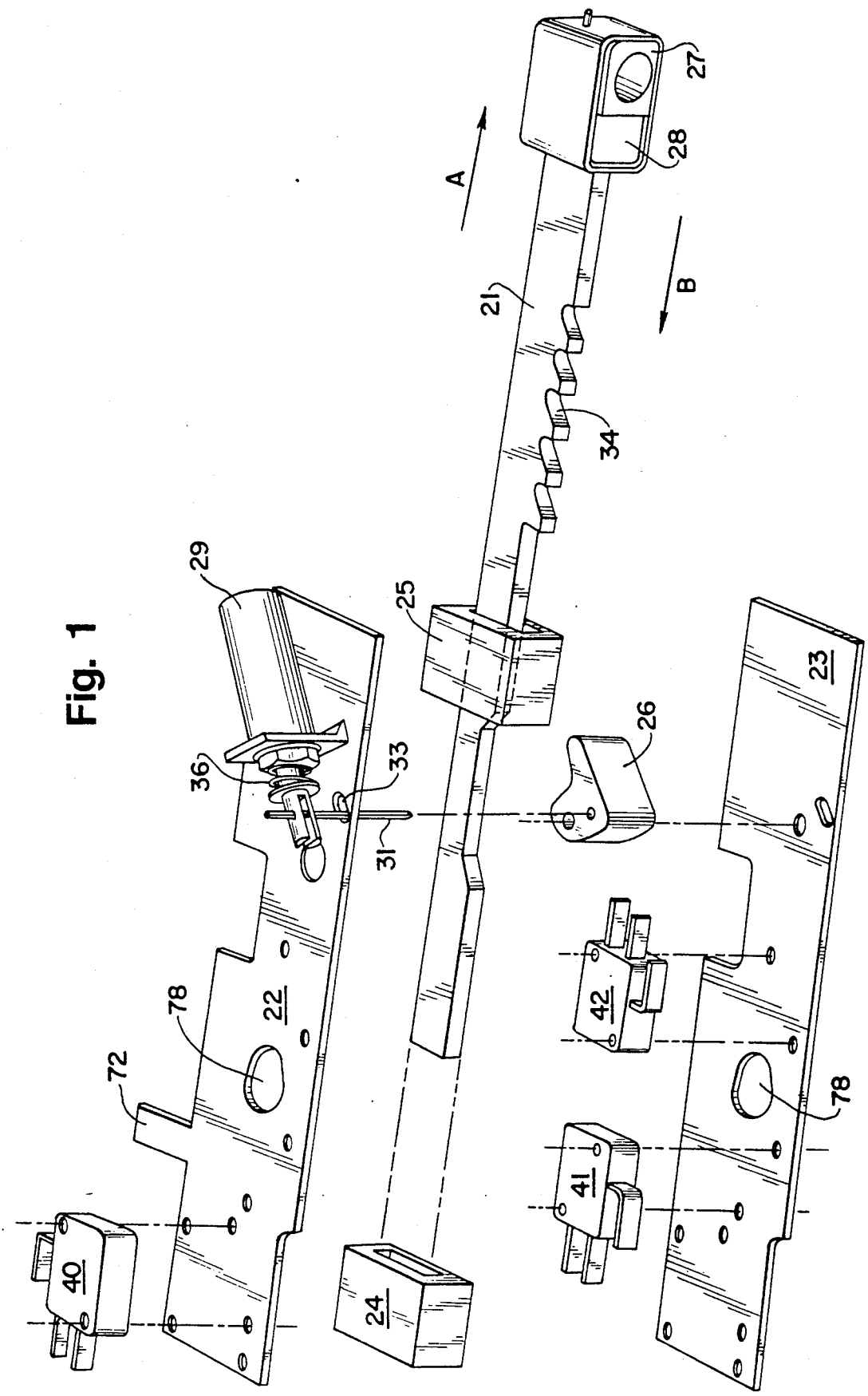
FIG. 1 is a perspective view of the invention.

FIG. 2 diagrammatically depicts the general location of the present invention 10 within a vehicle seat suspension. In the disclosed embodiment, it is situated on the bottom housing plate 14 of a seat suspension, with top and bottom housing plates 12 and 14 connected by scissor arms 16. The ends of the scissor arms 16 are typically connected by shafts that slide in slots 17 at the ends of housing plates 12 and 14. The present invention is ordinarily used with an air spring 18.

FIGS. 1, 3 and 5 depict the principal features and parts of the invention. Two blocks of lubricating plastic, slider blocks 24 and 25, are fixed between upper plate 22 and lower plate 23. Latch bar 21 is fixed in the slider blocks so that it is capable only of linear motion in the direction of Arrows A and B. At one end the latch bar has a plastic bearing 27 that is connected to and moved by the shafts that are connected to scissor arms 16. Bumper block 28 is an elastic substance inserted to cushion the forces on the bearing 27. Solenoid 29 is connected to latch pawl 26 by pin 31, which moves in slot 33 of upper plate 22. Latch pawl 26 pivots about pin 32. Compression spring 36 forces pin 31 and latch pawl 26 outward from solenoid 29 when the solenoid is not actuated. Electrical switches 40, 41, and 42 are normally closed ("NC") and include respectively contacts 40A, 41A, and 42A.

FIG. 6 depicts the configuration of latch bar 21 that enables the present invention to incorporate both the ride zone protection feature and the up-stop feature. Recessed edge 50 is parallel to but horizontally spaced from edges 54 and 55 of the latch bar. Ramp edges 51 and 52 connect edge 50 with edges 54 and 55. Edges 51, 54 and 52, 55 are the ones that engage contacts 41A and 42A of switches 41 and 42. The bar also possesses 5 notches 34 that are engageable with latch pawl 26.

In the operation of the ride zone protection feature, the latch bar 21 slides linearly through slider blocks 24 and 25. The slider blocks, which act as bearings, are fixed by screws 80 and nuts 82 between upper and lower plates 22 and 23, as are switches 41 and 42. Latch bar 21 moves relative to those switches, because plates 22 and 23 are fixed with respect to the suspension housing when the vehicle seat is occupied.

Figure 7:
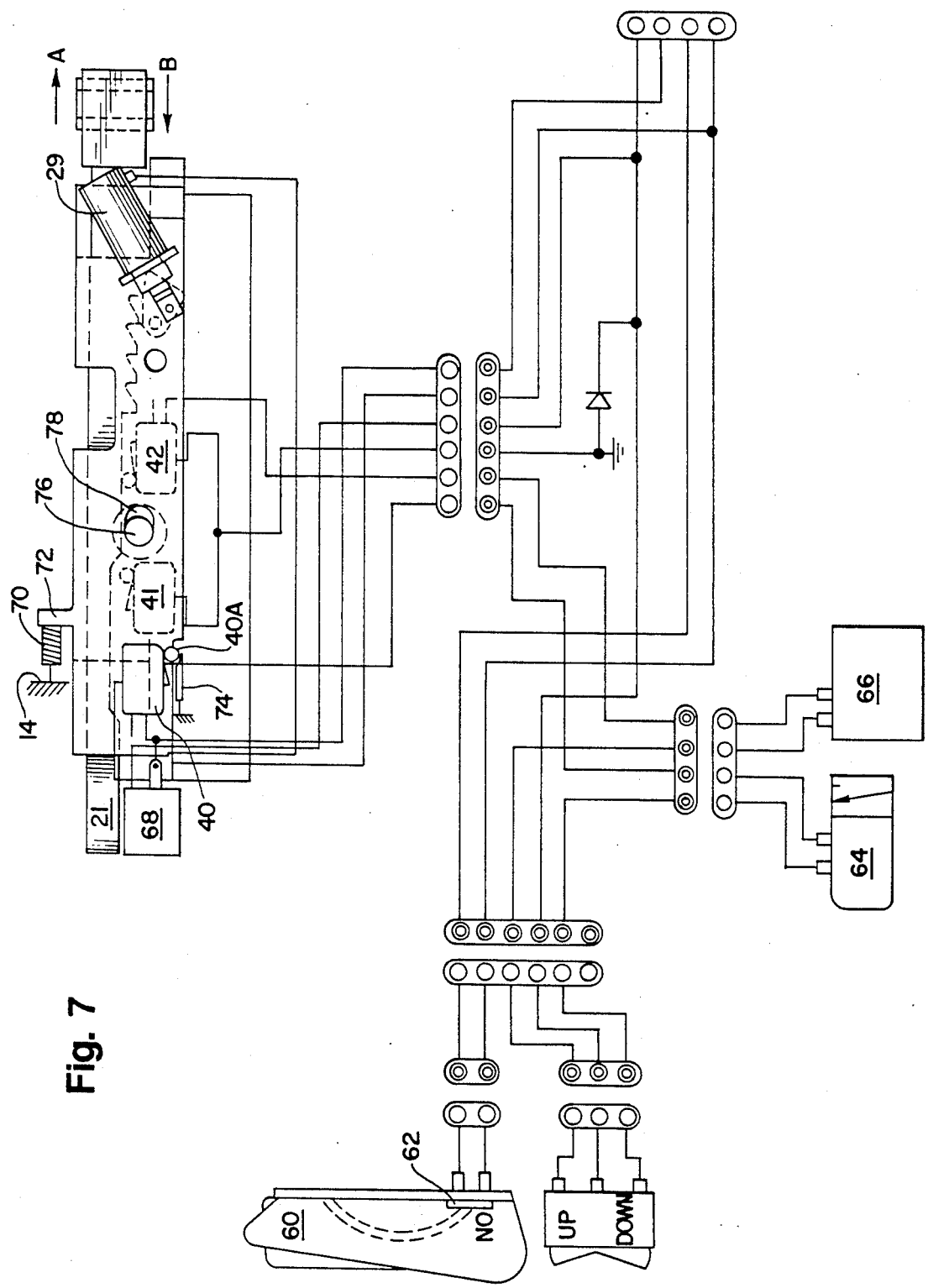
FIG. 7 is a schematic of the invention including various control features.

FIG. 3 shows the ride zone protection feature in a configuration representing the maximum height of the seta suspension. As a load is placed upon the seat suspension, the latch bar 21 is forced in the direction of Arrow A. When the ride zone protection feature is configured as shown in FIG. 3, a means for controlling the charging or discharging of air, such as normally closed switch 42, is opened by engagement with edge 55. This opens the compressor 66 circuit (see FIG. 7), interrupting power to the compressor and thus preventing the operator from adjusting the air spring above a maximum safe ride position.

By its connection to the scissors 16, latch bar 21 translates the vertical motion of the seat suspension into horizontal motion. As the latch bar moves in the direction of Arrow A, edge 50 moves adjacent to contact 42A, so that there is no physical contact between the bar 21 and the switch 42. Thus, switch 42 returns to its normally closed state, enabling the compressor. While latch bar 21 is situated so that edge 50 is adjacent to contact 42A, but not touching it, the compressor 66 remains enabled, so that the operator can adjust the air spring 18 by charging it with additional air. This configuration is shown in FIG. 4. In FIG. 3, with the compressor 66 disabled by the opening of switch 42, the vehicle operator cannot engage the compressor 66 (FIG. 7) to add additional air to the air spring.

As latch bar 21 moves continually in the direction of Arrow A, this represents a continual downward movement of the seat. As the seat moves lower and lower, air spring 18 must necessarily have air released to accommodate the lower seat. Switch 41 prevents an operator from releasing too much air from spring 18. As the latch bar 21 moves in the direction of Arrow A, contact 41A engages ramp 51 and then edge 54. When contact 41A is engaged with edge 54, normally closed switch 41 is opened. The opening of the switch in turn opens the solenoid valve 64 circuit (see FIG. 7), interrupting power to the valve, and thereby preventing the operator from adjusting the suspension below a minimum desired position by discharging more air.

The up-stop feature of the present invention becomes significant when an operator exits a vehicle seat. The seat 60 (FIG. 7) should contain a normally opened ("NO") switch 62 that is closed when the force of the driver's weight is removed from the seat 60. When switch 62 is closed, it activates relay 68 which energizes a latch actuating means, which includes solenoid 29. Since solenoid 29 is connected to latch pawl 26 by pin 31, when the solenoid 29 is energized, it drives latch pawl 26 into one of the notches 34 in latch bar 21. A plurality of notches are provided so that the latch bar can be locked in whatever location it is prior to the operator exiting the vehicle. Thus, it is not necessary for the latch bar to be moved a substantial distance before it is locked. In the preferred embodiment, the maximum rise of the seat is 50 millimeters.

When the operator exits the vehicle the pressure in the air spring 18 will force the suspension upward, thus tending to move latch bar 21 in the direction of Arrow B. This will force the complete engagement of latch pawl 26 with one of the notches 34, preventing further upward movement.

It is desirable to de-energize the solenoid once the latch has become engaged, so that when the vehicle is shut off, the battery is not continually drained. This is accomplished through a deactivating means, which includes electronic switch 40. The invention 10 is fixed in place by a compression spring 70 that is fixed to lower plate 14 of the suspension housing (see FIG. 7). The spring forces the device against rod 76 so that it presses against one end of slot 78, thus forcing the device into a fixed position (Rod 76 is secured to bottom housing plate 14). While the vehicle is in operation and the ride zone protection feature is being used, latch pawl 26 is not engaged, so latch bar 21 is free to slide back and forth while the remainder of the devices stays fixed by the spring and post. Spring 70 pushes against dog 72 which holds the fixed portion of the device, plates 22 and 23, against post 76.

Once latch pawl 26 is engaged, however, as air spring 18 expands and drives latch bar 21 in the direction of Arrow B, the force of the air spring translated through the latch bar overcomes the force of compression spring 70, and moves the entire device, latch bar 21 as well as the previously fixed portions attached to plates 22 and 23, to the left. As the entire device moves to the left, contact 40A of normally closed switch 40 contacts dog 74, tripping switch 40. When switch 40 is tripped, it cuts power to the solenoid. Even without the force of the solenoid, the upward force of the air spring, resulting in a translational force along the direction of Arrow B, keeps the latch pawl engaged until the operator reenters the seat. When the driver does reenter the seat, the force of his weight moves latch bar 21 in the direction of Arrow A, reducing the force on latch pawl 26. At that time, compression spring 36 pushes the end of solenoid 29 and rod 31 in a direction opposite that of the notches 34. Thus, latch pawl 26 is disengaged.

It should be noted that while the entire device moves during the operation of the up-stop feature, only the latch bar 21 moves while the driver is on the seat. Compression spring 70 and post 76 are free from any forces of the air spring because the latch pawl 26 is not engaged. Thus, latch bar 21 is free to move back and forth through the slider blocks.

In a preferred embodiment of the present invention, one solid block of Delrin ® is used for the slider blocks and also for the base to which the switches, solenoid, and latch pawl are attached. The block of Delrin ® and the other components are then enclosed by a steel housing. Consequently, the device is better protected from dirt and moisture and is also more resistant to tampering by a vehicle operator.

Of course, it should be understood that various changes and modifications to the preferred embodiments described herein will be apparent to those skilled in the art. Such changes and modifications can be made without departing from the spirit and scope of the present invention and without diminishing its attendant advantages. For example, it can easily be conceived that a movable member such as the latch bar would be oriented in a direction other than horizontal, or that it could be replaced by a member that moves in angular or circular motion. It is, therefore, intended that such changes and modifications be covered by the following claims.

What is claimed is:

1. A device for limiting the vertical displacement of a seat suspension when the load on the suspension is removed, comprising:
   means for sensing the load removal;
   means for locking the unloaded suspension in a fixed vertical position proximate the loaded position responsive to said sensing means, said locking means including a solenoid for engaging a latch; and
   means for unlocking the suspension.

2. The apparatus of claim 1 further comprising a means for disconnecting power to said solenoid.

3. The apparatus of claim 1 wherein said unlocking means comprises a spring for disengaging said latch.

4. The apparatus of claim 1 wherein said sensing means is an electronic switch.

5. A vehicle suspension apparatus for protecting an air spring and for limiting the vertical displacement of a vehicle seat supported by the air spring when the seat is vacated by an occupant, comprising:
   a movable member responsive to the vertical motion of the vehicle seat and including a plurality of notches;
   means for varying the pressure in the air spring;
   means for enabling and disabling said varying means responsive to engagement or disengagement with said movable member;
   means for substantially instantly sensing the occupant vacating the seat;
   means for substantially instantly locking the suspension when the seat is vacated at substantially the same position as before the seat was vacated, said locking means being responsive to said sensing means and adapted to engage one of said notches of said movable member; and
   means for unlocking the suspension, including means for disengaging said locking means from said notches of said movable member.

6. The device of claim 5 further comprising a bearing means to facilitate the movement of said movable member.

7. The device of claim 5 wherein said unlocking means provides a biasing force in a direction away from said notches.

8. The apparatus of claim 5 wherein said actuating means comprises a first switch for limiting the gas pressure to a minimum amount and a second switch for limiting the gas pressure to a maximum amount.

9. The apparatus of claim 5, wherein said locking means includes a solenoid for engaging a latch.

10. A device for limiting the vertical displacement of a vehicle seat air spring suspension when the load on the suspension is removed and for protecting the air spring, comprising:
   a movable member responsive to the vertical motion of the seat;
   engageable latch means for limiting upward movement of the seat when the load on the suspension is removed, said latch means normally being disengaged while the vehicle seat is occupied and, said latch means including notches on said movable member;
   electrical means for sensing when the vehicle seat is not loading the seat suspension;
   latch actuating means, responsive to said electrical sensing means, for moving said latch means into engagement to limit upward movement of the seat suspension so that it remains in substantially the same position as when loaded;
   electrical means for deactivating said latch actuating means while said latch means remains engaged to limit upward movement of the seat suspension;
   biasing means for disengaging said latch means;
   means for varying the pressure in the air spring; and
   means for enabling and disabling said varying means responsive to engagement or disengagement with said movable member.

11. A device for limiting the vertical displacement of a seat suspension when the load on the suspension is removed and for protecting an air spring, comprising:
   means for substantially instantly sensing the load removal;
   locking means, responsive to said sensing means, for substantially instantly fixing the suspension in a position vertically proximate to the position of the suspension prior to removal of the load;
   means for unlocking the suspension;
   means for adding and releasing compressed air to the air spring;
   first and second electrical switches; and
   a slidable member positionally engageable with said first and second electrical switches, whereby in one position of said slidable member air can be added or released, in a second position air can be added but not released, and in a third position air can be released but not added.

* * * * *